United States Patent
Zhong et al.

(10) Patent No.: US 11,406,124 B2
(45) Date of Patent: Aug. 9, 2022

(54) METHOD FOR PREPARING DOUBLE-LAYERED BURSTING BEADS WITH MILK TEA FLAVOR

(71) Applicant: Jiangnan University, Wuxi (CN)

(72) Inventors: Fang Zhong, Wuxi (CN); Fei Liu, Wuxi (CN); Hongxiang Liu, Wuxi (CN); Maoshen Chen, Wuxi (CN); Feifei Xu, Wuxi (CN)

(73) Assignee: Jiangnan University, Wuxi (CN)

( * ) Notice: Subject to any disclaimer, the term of this patent is extended or adjusted under 35 U.S.C. 154(b) by 199 days.

(21) Appl. No.: 16/842,815

(22) Filed: Apr. 8, 2020

(65) Prior Publication Data

US 2021/0015142 A1    Jan. 21, 2021

(30) Foreign Application Priority Data

Jul. 18, 2019 (CN) .......................... 201910650140.6

(51) Int. Cl.
*A23P 10/30* (2016.01)
*A23L 29/00* (2016.01)
(Continued)

(52) U.S. Cl.
CPC ................ *A23P 10/30* (2016.08); *A23F 3/14* (2013.01); *A23L 29/015* (2016.08);
(Continued)

(58) Field of Classification Search
CPC ...... A23P 10/30; A23L 29/035; A23L 29/275; A23L 29/231; A23L 29/256; A23L 29/015; A23L 29/25; A23F 3/14
(Continued)

(56) References Cited

U.S. PATENT DOCUMENTS

2018/0146704 A1 *  5/2018  Ramon Real ............ A23G 3/54

FOREIGN PATENT DOCUMENTS

CN        102640963 A  *  8/2012

OTHER PUBLICATIONS

Yang et al., Study of sodium-calcium alginate gel properties and their use in low-fat pork emulsion, Food Industry Technology, No. 6, 2012, pp. 374-376.). (Year: 2012).*

* cited by examiner

*Primary Examiner* — Brent T O'Hern
(74) *Attorney, Agent, or Firm* — Idea Intellectual Limited; Margaret A. Burke; Sam T. Yip

(57) ABSTRACT

The present invention provides a method for preparing double-layered bursting beads with milk tea flavor comprising: preparing inner and/or outer shell forming solutions for inner and/or outer shells of the bursting beads; preparing inner and/or outer core material solutions for inner and/or outer core materials of the bursting beads; preparing inner and/or outer shell curing solutions for inner and/or outer shells of the bursting beads; adding the inner core material solution into the inner shell forming solution, incubating, curing in the inner shell curing solution, and filtering to obtain inner bursting beads; and adding the inner bursting beads and the outer core material solution into the outer shell forming solution, and curing in the outer shell curing solution to obtain the double-layered bursting beads. The present invention improves bursting ability, densification, product instability due to complex browning and precipitation between tea polyphenol and protein during storage, and mechanical properties thereof.

6 Claims, 1 Drawing Sheet

(51) Int. Cl.
 *A23L 29/275* (2016.01)
 *A23L 29/231* (2016.01)
 *A23L 29/256* (2016.01)
 *A23L 29/25* (2016.01)
 *A23F 3/14* (2006.01)

(52) U.S. Cl.
 CPC ........... *A23L 29/035* (2016.08); *A23L 29/231* (2016.08); *A23L 29/25* (2016.08); *A23L 29/256* (2016.08); *A23L 29/275* (2016.08)

(58) Field of Classification Search
 USPC .......................................................... 426/98
 See application file for complete search history.

METHOD FOR PREPARING DOUBLE-LAYERED BURSTING BEADS WITH MILK TEA FLAVOR

CROSS-REFERENCE TO RELATED APPLICATION

This application claims priority from the Chinese Patent Application Number 2019106501406 filed on Jul. 18, 2019, and the disclosure of which is incorporated herein by reference in its entirety.

FIELD OF THE INVENTION

The present invention relates to the technical field of food processing. More particularly, it relates to a preparation method for double-layered bursting beads with milk tea flavor.

BACKGROUND

Bursting beads is a new type of food. It is based on the complexation gelling reaction between sodium alginate and divalent cation. The reverse spherification technique can be used to wrap fruit juice in the thin film. It has a unique taste while eating, and the fruit juice will flow out after squeezing and crushing.

Most of the existing bursting beads are fruit flavored uniform product. Moreover, the coating film of the product is low strength, low shear resistance, fast diffusion of the flavored substances, easy to break and other undesirable phenomena. It is often used as a supplement in the beverage or drinks, and the application is limited. The milk is rich in protein, amino acids, nutrition and easy to digest; tea polyphenol is the active ingredient in the tea, which includes many functions such as antioxidant activity and elimination of free radicals in human body. The milk tea beverage is loved by consumers because of its delicious taste, variety and strong nutritional complementarity between the milk and tea polyphenols. However, the interaction between the proteins and the plant phenols would make the milk tea beverage generate astringent taste, become turbid and form precipitates. Furthermore, quinone oxidized from tea polyphenols will have enzymatic browning reaction with certain amino acids. The floccules formed by the interaction between phenols and proteins seriously affect the production and storage stability of protein beverages.

SUMMARY OF THE INVENTION

This section aims to summarize some aspects of the embodiments of the present invention and to briefly describe some preferred embodiments. The simplification or omission may be made in this section, the abstract of the specification, and the title to avoid obscuring the purpose of this section, the abstract of the specification, and the title. Such simplification or omission may not be used to limit the scope of the present invention.

The present invention is made in view of the above-mentioned technical drawbacks to provide a method for preparing double-layered bursting beads with milk tea flavor.

Benefits of the present invention include: two different liquids with different flavors are encapsulated into the same bursting bead; the beads can be burst twice by pressing during eating, leading to separate outflow of tea flavor beverage and milk flavor beverage from the same bead, which makes it more interesting and interactive. The application of new thickener formulation improves bursting ability and densification, which avoids leakage of the liquid and loss of flavored substances from the beads. Moreover, separation of tea from milk would avoid instability due to the bad complex browning and precipitation between tea polyphenol and protein during storage, while storage stability and mechanical properties of the product are improved.

DETAILED DESCRIPTION

Example 1

Figure 1:
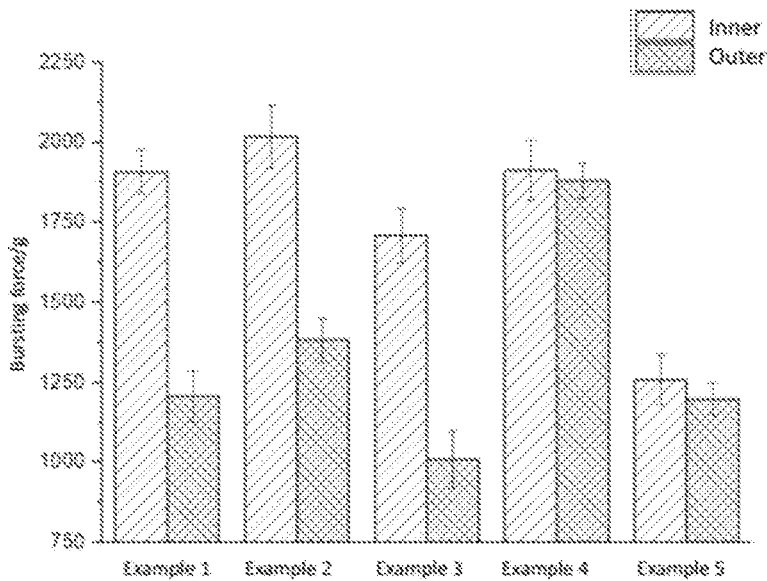
FIG. 1 shows the bursting force results of inner shell and outer shell of embodiments 1 to 5 of the present invention.

(1) Preparation of inner shell forming solution: 1 part of sodium alginate and pectin in a ratio of 2:1 are dissolved in 99 parts of pure water at room temperature to obtain the inner shell forming solution of the inner bursting beads. The viscosity of sodium alginate is about 700 mPa·s and guluronic acid/mannuronic acid (G/M) ratio (or value) is 1.8.

(2) Preparation of inner core material solution: 0.6 parts of xanthan gum, 0.05 parts of pectin, 0.05 parts of locust bean gum and 15 parts of milk powder are dispersed evenly into 50 parts of 60° C. pure water to obtain the first mixture. 1.5 parts of calcium lactate and 1 part of sugar are dissolved in sufficient amount of pure water at room temperature to obtain a second mixture. The second mixture is then added into the first mixture, mixed evenly, and cooled to room temperature, in order to obtain the inner core material solution for inner bursting beads.

(3) Preparation of curing solutions: 2 parts of calcium lactate and 0.05 parts of chitosan hydrochloride are uniformly dispersed into 98 parts of water to obtain an inner shell curing solution (curing solution 1). 2.5 parts of calcium lactate and 0.05 parts of chitosan hydrochloride are uniformly dispersed into 97.5 parts of water to obtain an outer shell curing solution (curing solution 2).

(4) Preparation of inner bursting beads: the inner core material solution for the inner bursting beads is added dropwise with the flow rate of 1 μL/s into the inner shell forming solution, and incubated for 3 minutes to form a plurality of beads. The beads are collected and cured in the curing solution 1 for 5 minutes, followed by filtering out the solution to obtain the inner bursting beads.

(5) Preparation of outer shell forming solution: 0.8 parts of sodium alginate and gellan gum in a ratio of 1:1 are dissolved in 99.2 parts of pure water at room temperature to obtain an outer shell forming solution. The viscosity of sodium alginate is 430 mPa·s and its G/M ratio is 1.4.

(6) Preparation of outer core material solution: 0.5 parts of pullulan polysaccharide, 0.5 parts of arabic gum, 0.5 parts of guar gum are dispersed into 60 parts of pure water at 60° C. to obtain a first mixture. 2 parts of calcium lactate, 10 parts of concentrated oolong tea, and 0.2 parts of sucrose are dissolved in sufficient amount of pure water at room temperature to obtain a second mixture. The second mixture is then added into the first mixture, mixed evenly, cooled to room temperature, in order to obtain an outer core material solution.

(7) Preparation of double-layered bursting beads: the inner bursting beads and the outer core material solution in a ratio of 1:1 are put into a molding machine, followed by dropping which at a flow rate of 5 μL/s into the outer shell forming solution and incubating them for 3 minutes to form bursting beads. The bursting beads are collected and cured in the curing solution 2 for 4 minutes, followed by filtering out the solution to obtain the double-layered bursting beads. The double-layer bursting beads are placed in a protective solution containing calcium ions, sucrose, flavoring substances, etc., and sterilized at 85° C. for 15 minutes.

In the formulation of the present invention, alginate and the calcium ion are essential because their crosslinking characteristic is the key to perform gel reaction to form the gel film. The gel network structure of the shells of the bursting bead cannot be formed without adding the calcium ions. As for the core materials, except for the calcium salt, the inner core material can be composed of milk powder, pectin, xanthan gum, locust bean gum and one or more of the hydrocolloids with low concentration and high/medium-high viscosity such as starch, tara gum carboxymethylcellulose, etc. High viscosity material is selected to ensure high viscosity so as to give milk a creamy taste. The outer core material can be composed of tea, pullulan polysaccharide, arabic gum, guar gum and one or more of the hydrocolloids with high concentration and low/medium-low viscosity such as hydroxypropyl methylcellulose, etc. Selection of low viscosity materials ensures the clarity of tea itself. In addition, sucrose can be replaced by syrup and sweetener, etc.

In the present invention, heating is for promoting the rapid dispersion and dissolution of the colloids, and make the colloid molecules loose to form the network structure, which embed the milk powder in. Meanwhile, heating at 60° C. will not cause damage to the molecular structure. Due to the viscous colloid of the first mixture, which is difficult to dissolve, the operation of separate dissolution and remixing without being dissolved directly in hot water is adopted in step (2). If calcium salt and sugar are added, the dissolution rate will decline and uneven dissolution or agglomeration will occur due to ion complexation, water absorption and other reasons. Same principle applies in the preparation of the outer core material solution. In step (7), because the particle size of the relatively bigger bursting bead is large and the volume of the core material in each bead is relatively larger, the flow rate in the molding machine is increased accordingly.

During trials, it is found that the strength of the inner bursting beads should be higher than that of the outer bursting beads so as to keep a low damage rate of the double-layered beads after sterilization. As such, the sodium alginate with high viscosity and high G/M ratio is selected. In addition, it is also found that having high G/M ratio provides higher binding ability to calcium ion than having low G/M ratio. In the case where sodium alginate in the inner shell having high G/M ratio, if the concentration of the calcium lactate in the curing solution is high, the calcium ion in the curing solution will compete for the calcium ion in the shell, resulting in a great decrease in its strength. Therefore, different curing solutions are selected in the present invention to meet the actual requirements of the corresponding shells of inner and outer bursting beads.

Example 2

(1) Preparation of inner shell forming solution: 1 part of potassium alginate and pectin in a ratio of 2:1 are dissolved in 99 parts of pure water at room temperature to obtain the inner shell forming solution of the inner bursting bead. The viscosity of potassium alginate is 800 mPa·s and G/M ratio is 1.6.

(2) Preparation of inner core material solution: 0.6 parts of xanthan gum, 0.05 parts of pectin, 0.05 parts of locust bean gum and 15 parts of milk powder are dispersed evenly into 50 parts of 60° C. pure water to obtain a first mixture. 1.5 parts of calcium lactate and 1 part of sugar are dissolved in sufficient amount of pure water at room temperature to obtain a second mixture. The second mixture is added into the first mixture, mixed evenly, cooled to room temperature, to obtain the inner core material solution for inner bursting beads.

(3) Preparation of curing solutions: 2 parts of calcium lactate and 0.05 parts of chitosan hydrochloride are uniformly dispersed into 98 parts of water to obtain an inner shell curing solution (curing solution 1). 2.5 parts of calcium lactate and 0.05 parts of chitosan hydrochloride are dispersed uniformly into 97.5 parts of water to obtain an outer shell curing solution (curing solution 2).

(4) Preparation of inner bursting beads: the inner core material solution for the inner bursting beads is added dropwise with a flow rate of 1 μL/s into the inner shell forming solution, and incubated for 3 minutes to form a plurality of beads. The beads are collected and cured in the curing solution 1 for 5 minutes, followed by filtering out the solution to obtain the inner bursting beads.

(5) Preparation of outer shell forming solution: 0.8 parts of potassium alginate and gellan gum in a ratio of 1:1 are dissolved in 99.2 parts of pure water at room temperature to obtain an outer shell forming solution. The viscosity of potassium alginate is 500 mPa·s and its G/M ratio is 1.5.

(6) Preparation of outer core material solution: 0.5 parts of pullulan polysaccharide, 0.5 parts of arabic gum, 0.5 parts of guar gum are dispersed into 60 parts of pure water at 60° C. to obtain a first mixture. 2 parts of calcium lactate, 10 parts of concentrated black tea, and 0.2 parts of sucrose are dissolved in sufficient amount of pure water at room temperature to obtain a second mixture. The second mixture is added into the first mixture, mixed evenly, cooled to room temperature, to obtain the outer core material solution.

(7) Preparation of double-layered bursting beads: the inner bursting beads and the outer core material solution in a ratio of 1:1 are put into a molding machine, followed by dropping which at a flow rate of 5 μL/s into the outer shell forming solution, and incubated them for 3 minutes to form bursting beads. The bursting beads are collected and cured in the curing solution 2 for 4 minutes, followed by filtering out the solution to obtain the double-layered bursting beads. The double-layer bursting beads are placed in a protective solution and sterilized at 85° C. for 15 minutes.

Example 3

(1) Preparation of inner shell forming solution for the inner bursting beads: 1 part of sodium alginate and pectin in a ratio of 2:1 are dissolved in 99 parts of pure water at room temperature to obtain the inner shell forming solution. The viscosity of sodium alginate is 700 mPa·s and its G/M ratio is 1.8.

(2) Preparation of inner core material solution: 0.6 parts of xanthan gum, 0.05 parts of pectin, 0.05 parts of locust bean gum and 15 parts of milk powder are dispersed evenly into 50 parts of 60° C. pure water to obtain a first mixture. 1.5 parts of calcium lactate and 1 part of sugar are dissolved in sufficient amount of pure water at room temperature to obtain a second mixture. The second mixture is added into the first mixture, mixed evenly, cooled to room temperature, to obtain the inner core material solution for the inner bursting beads.

(3) Preparation of curing solution: 2 parts of calcium lactate are uniformly dispersed into 98 parts of water to obtain an inner shell curing solution (curing solution 1). 2.5 parts of calcium lactate are dispersed uniformly into 97.5 parts of water to obtain the outer shell curing solution (curing solution 2).

(4) Preparation of inner bursting beads: the inner core material solution is dropped at a flow rate of 1 μL/s into the inner shell forming solution and incubated for 3 min to form beads. The beads are collected and cured in the curing solution 1 for 5 minutes, followed by filtering out the solution to obtain inner bursting beads.

(5) Preparation of outer shell forming solution: 0.8 parts of sodium alginate and gellan gum in a ratio of 1:1 are dissolved in 99.2 parts of pure water at room temperature to obtain an outer shell forming solution. The viscosity of sodium alginate is 430 mPa·s and its G/M ratio is 1.4.

(6) Preparation of outer core material solution: 0.5 parts of pullulan polysaccharide, 0.5 parts of arabic gum, 0.5 parts of guar gum are dispersed into 60 parts of pure water at 60° C. to obtain a first mixture. 2 parts of calcium lactate, 10 parts of concentrated green tea, and 0.2 parts of sucrose are dissolved in sufficient amount of pure water at room temperature to obtain a second mixture. The second mixture is added into the first mixture, mixed evenly, cooled to room temperature, to obtain the outer core material solution.

(7) Preparation of double-layered bursting beads: the inner bursting beads and the outer core material solution in a ratio of 1:1 are put into a molding machine, followed by dropping at a flow rate of 5 μL/s into the outer shell forming solution and incubating them for 3 minutes to form bursting beads. The bursting beads are collected and cured in the curing solution 2 for 4 minutes, and the solution is filtered out to obtain double-layered bursting beads. The double-layer bursting beads are placed in a protective solution and sterilized at 80° C. for 20 minutes.

Example 4

(1) Preparation of inner shell forming solution for inner bursting beads: 0.8 parts of sodium alginate and gellan gum in a ratio of 1:1 are dissolved in 99.2 parts of pure water at room temperature to obtain the inner shell forming solution. The viscosity of sodium alginate is 700 mPa·s and G/M ratio is 1.8.

(2) Preparation of inner core material solution: 0.6 parts of xanthan gum, 0.05 parts of pectin, 0.05 parts of locust bean gum and 15 parts of milk powder are dispersed evenly into 50 parts of 60° C. pure water to obtain a first mixture. 1.5 parts of calcium lactate and 1 part of sugar are dissolved in sufficient amount of pure water at room temperature to obtain a second mixture. The second mixture is added into the first mixture, mixed evenly, cooled to room temperature, to obtain the inner core material solution.

(3) Preparation of curing solutions: 2 parts of calcium lactate and 0.05 parts of chitosan hydrochloride are uniformly dispersed into 98 parts of water to obtain an inner shell curing solution (curing solution 1). 2.5 parts of calcium lactate and 0.5 parts of chitosan hydrochloride are dispersed uniformly into 97.5 parts of water to obtain an outer shell curing solution (curing solution 2).

(4) Preparation of inner bursting beads: the inner core material solution is dropped at a flow rate of 1 μL/s into the inner shell forming solution and incubated for 3 min to form a plurality of beads. The beads are collected and cured in the curing solution 1 for 5 minutes, followed by filtering out the solution to obtain inner bursting beads.

(5) Preparation of outer shell forming solution: 0.8 parts of sodium alginate and gellan gum in a ratio of 1:1 are dissolved in 99.2 parts of pure water at room temperature to obtain an outer shell forming solution. The viscosity of sodium alginate is 700 mPa·s and its G/M ratio is 1.8.

(6) Preparation of outer core material solution: 0.5 parts of pullulan polysaccharide, 0.5 parts of arabic gum, 0.5 parts of guar gum are dispersed into 60 parts of pure water at 60° C. to obtain a first mixture. 2 parts of calcium lactate, 10 parts of concentrated oolong tea, and 0.2 parts of sucrose are dissolved in sufficient amount of pure water at room temperature to obtain a second mixture. The second mixture is added into the first mixture, mixed evenly, cooled to room temperature, to obtain the outer core material solution.

(7) Preparation of double-layered bursting beads: the inner bursting beads and the outer core material solution in a ratio of 1:1 are put into a molding machine, followed by dropping at a flow rate of 5 μL/s into the outer shell forming solution and incubating them for 3 minutes to form the bursting beads. The bursting beads are collected and cured in the curing solution 2 for 4 minutes, and the solution is filtered out to obtain the double-layered bursting beads. The double-layer bursting beads are placed in a protective solution and sterilized at 70° C. for 30 minutes.

Example 5

(1) Preparation of inner shell forming solution for the inner bursting beads: 1 part of sodium alginate and pectin in a ratio 2:1 are dissolved in 99 parts of pure water at room temperature to obtain an inner shell forming solution. The viscosity of sodium alginate is 430 mPa·s and its G/M ratio is 1.4.

(2) Preparation of inner core material solution: 0.6 parts of xanthan gum, 0.05 parts of pectin, 0.05 parts of locust bean gum and 15 parts of milk powder are dispersed evenly into 50 parts of 60° C. pure water to obtain a first mixture. 1.5 parts of calcium lactate and 1 part of sugar are dissolved in sufficient amount of pure water at room temperature to obtain a second mixture. The second mixture is added into the first mixture, mixed evenly, cooled to room temperature, to obtain an inner core material solution.

(3) Preparation of curing solutions: 2 parts of calcium lactate and 0.05 parts of chitosan hydrochloride are uniformly dispersed into 98 parts of water to obtain an inner shell curing solution (curing solution 1). 2.5 parts of calcium lactate and 0.05 parts of chitosan hydrochloride are dispersed uniformly into 97.5 parts of water to obtain an outer shell curing solution (curing solution 2).

(4) Preparation of inner bursting bead: the inner core material solution is added dropwise at a flow rate of 1 μL/s into the inner shell forming solution and incubated for 3 minutes to form a plurality of beads. The beads are collected and cured in the curing solution 1 for 5 minutes, and the solution is filtered out to obtain inner bursting beads.

(5) Preparation of outer shell forming solution: 1 part of sodium alginate and pectin in a mass ratio 2:1 are dissolved in 99 parts of pure water at room temperature to obtain the outer shell forming solution of the outer bursting bead. The viscosity of sodium alginate is 430 mPa·s and its G/M ratio is 1.4.

(6) Preparation of outer core material solution: 0.5 parts of pullulan polysaccharide, 0.5 parts of arabic gum, 0.5 parts of guar gum are dispersed into 60 parts of pure water at 60°

C. to obtain a first mixture. 2 parts of calcium lactate, 10 parts of concentrated oolong tea, and 0.2 parts of sucrose are dissolved in sufficient amount of pure water at room temperature to obtain a second mixture. The second mixture is added into the first mixture, mixed evenly, cooled to room temperature, to obtain an outer core material solution.

(7) Preparation of double-layered bursting beads: the inner bursting beads and the outer core material solution in a ratio of 1:1 are put into a molding machine, followed by dropping at a flow rate of 5 µL/s into the outer shell forming solution and incubating them for 3 minutes to form bursting beads. The bursting beads are collected and cured in the curing solution 2 for 4 minutes, and the solution is filtered out to obtain double-layered bursting bead. The double-layer bursting beads are placed in a protective solution and sterilized at 85° C. for 20 minutes.

Comparative Example 1

The order of adding milk powder and tea concentrate is reversed in this comparative example 1.

(1) Preparation of inner shell forming solution for inner bursting beads: 1 part of sodium alginate and pectin in a ratio of 2:1 are dissolved in 99 parts of pure water at room temperature to obtain an inner shell forming solution. The viscosity of sodium alginate is 700 mPa·s and its G/M ratio is 1.8.

(2) Preparation of inner core material: 0.5 parts of pullulan polysaccharide, 0.5 parts of arabic gum, 0.5 parts of guar gum and 10 parts of concentrated oolong tea are dispersed into 60 parts of pure water at 60° C. to obtain a first mixture. 2 parts of calcium lactate and 0.2 parts of sucrose are dissolved in sufficient amount of pure water at room temperature to obtain a second mixture. The second mixture is added into the first mixture, mixed evenly, cooled to room temperature, to obtain an inner core material.

(3) Preparation of curing solutions: 2 parts of calcium lactate and 0.05 parts of chitosan hydrochloride are uniformly dispersed into 98 parts of water to obtain an inner shell curing solution (curing solution 1). 2.5 parts of calcium lactate and 0.05 parts of chitosan hydrochloride are dispersed evenly into 97.5 parts of water to obtain an outer shell curing solution (curing solution 2).

(4) Preparation of inner bursting beads: the inner core material solution is added dropwise at a flow rate of 1 µL/s into the inner shell forming solution and incubated for 3 minutes to form a plurality of beads. The beads are collected and cured in the curing solution 1 for 5 min, and the solution is filtered out to obtain inner bursting beads.

(5) Preparation of outer shell forming solution: 0.8 parts of sodium alginate and gellan gum in a ratio of 1:1 are dissolved in 99.2 parts of pure water at room temperature to obtain an outer shell forming solution. The viscosity of sodium alginate is 430 mPa·s and its G/M ratio is 1.4.

(6) Preparation of outer core material solution: 0.6 parts of xanthan gum, 0.05 parts of pectin, and 0.05 parts of locust bean gum are dispersed evenly into 50 parts of 60° C. pure water to obtain a first mixture. 1.5 parts of calcium lactate, 15 parts of milk powder and 1 part of sugar are dissolved in sufficient amount of pure water at room temperature to obtain a second mixture. The second mixture is added into the first mixture, mixed evenly, cooled to room temperature, to obtain an outer core material solution.

(7) Preparation of double-layered bursting beads: the inner bursting beads and the outer core material solution in a ratio of 1:1 are put into a molding machine, followed by dropping at a flow rate of 5 µL/s into the outer shell forming solution and incubating them for 3 minutes to form bursting beads. The bursting beads are collected and cured in the curing solution 2 for 4 minutes, and the solution is filtered out to obtain double-layered bursting beads. The double-layer bursting beads are placed in a protective solution and sterilized at 85° C. for 15 minutes.

It is observed that the inner and outer core material solutions of double-layered bursting beads in comparative example 1 have more flocculent precipitates after sterilization, which might be formed by the complexation reaction of polyphenols in tea and proteins such as casein and whey protein in milk powder. It can be seen that the order of adding milk powder and concentrated tea is substantially important for the appearance of the double-layered bursting beads.

Comparative Example 2

Both the milk powder and the concentrated tea are added into the same core material solution to prepare a single-layered bursting bead.

(1) Preparation of a shell forming solution for bursting beads: 1 part of sodium alginate and pectin in a ratio of 2:1 are dissolved in 99 parts of pure water at room temperature to obtain a shell forming solution for the bursting beads. The viscosity of sodium alginate is 700 mPa·s and its G/M ratio is 1.8.

(2) Preparation of a core material solution: 0.6 parts of xanthan gum, 0.05 parts of pectin, 0.05 parts of locust bean gum and 15 parts of milk powder are dispersed evenly into 50 parts of 60° C. pure water to obtain a first mixture. 1.5 parts of calcium lactate, 10 parts of oolong tea and 1 part of sugar are dissolved in sufficient amount of pure water at room temperature to obtain a second mixture. The second mixture is added into the first mixture, mixed evenly, cooled to room temperature, to obtain the core material of the bursting bead.

(3) Preparation of curing solution: 2.5 parts of calcium lactate and 0.5 parts of chitosan hydrochloride are uniformly dispersed into 97.5 parts of water to obtain a curing solution (curing solution 1).

(4) Preparation of the bursting bead: the core material solution is added dropwise at a flow rate of 1 µL/s into the shell forming solution and incubated for 3 minutes to form a plurality of beads. The beads are collected and cured in the curing solution 1 for 5 minutes, and the solution is filtered out to obtain single-layered bursting beads. The single-layered bursting beads are placed in a protective solution and sterilized at 85° C. for 15 minutes.

It is observed that the concentrated tea and the milk in the core material of the single-layered bursting bead in comparative example 2 form flocculent precipitates before the sterilization, and the degree of precipitation increases dramatically after the sterilization.

Comparative Example 3

(1) Preparation of inner shell forming solution for inner bursting beads: 1 part of pectin is dissolved in 99 parts of pure water at room temperature to obtain an inner shell forming solution.

(2) Preparation of inner core material solution: 0.6 parts of xanthan gum, 0.05 parts of pectin, and 0.05 parts of locust bean gum and 15 parts of milk powder evenly are dispersed into 50 parts of 60° C. pure water to obtain a first mixture. 1.5 parts of calcium lactate and 1 part of sugar are dissolved in sufficient amount of pure water at room temperature to obtain a second mixture. The second mixture is added into the first mixture, mixed evenly, cooled to room temperature, to obtain an inner core material solution.

(3) Preparation of curing solutions: 2 parts of calcium lactate and 0.05 parts of chitosan hydrochloride are uniformly dispersed into 98 parts of water to obtain an inner shell curing solution (curing solution 1). 2.5 parts of calcium lactate and 0.05 parts of chitosan hydrochloride are uniformly dispersed into 97.5 parts of water to obtain an outer shell curing solution (curing solution 2).

(4) Preparation of inner bursting beads: the inner core material solution is added dropwise at a flow rate of 1 μL/s into the inner shell forming solution and incubated for 3 minutes to form a plurality of beads. The beads are collected and cures in the curing solution 1 for 5 minutes, and the solution is filtered out to obtain inner bursting beads.

(5) Preparation of outer shell forming solution: 0.8 parts of gellan gum is dissolved in 99.2 parts of pure water at room temperature to obtain an outer shell forming solution. The viscosity of sodium alginate is 430 mPa·s and its G/M ratio is 1.4.

(6) Preparation of outer core material solution: 0.5 parts of pullulan polysaccharide, 0.5 parts of arabic gum, and 0.5 parts of guar gum are dispersed into 60 parts of pure water at 60° C. to obtain a first mixture. 2 parts of calcium lactate, 10 parts of concentrated oolong tea and 0.2 parts of sucrose are dissolved in sufficient amount of pure water at room temperature to obtain a second mixture. The second mixture is added into the first mixture, mixed evenly, and cooled to room temperature, to obtain an outer core material solution.

(7) Preparation of double-layered bursting bead: the inner bursting beads and the outer core material solution in a ratio of 1:1 are put into a molding machine, followed by dropping at a flow rate of 5 μL/s into the outer shell forming solution and incubating them for 3 minutes to form bursting beads. The bursting beads are collected and cured in the curing solution 2 for 4 minutes, and the solution is filtered out to obtain double-layered bursting beads. The double-layer bursting beads are placed in a protective solution containing calcium ions, sucrose, flavoring substances, etc. and sterilized at 85° C. for 15 minutes.

It is observed that structure of the bursting beads are fragile before sterilization. After sterilization, the structure of the bursting beads would be greatly damaged and the damage rate is as high as 95%, showing that the alginate is irreplaceable.

Example 6

(1) Preparation of inner shell forming solution for inner bursting beads: 1 part of potassium alginate and sodium alginate in a ratio of 2:1 are dissolved in 99 parts of pure water at room temperature to obtain an inner shell forming solution. The viscosity of potassium alginate is 800 mPa·s and its G/M ratio is 1.6. The viscosity of sodium alginate is 700 mPa·s and its G/M ratio is 1.6.

(2) Preparation of inner core material solution: 0.6 parts of xanthan gum, 0.05 parts of pectin, 0.05 parts of locust bean gum and 15 parts of milk powder are dispersed evenly into 50 parts of 60° C. pure water to obtain a first mixture. 1.5 parts of calcium lactate and 1 part of sugar are dissolved in sufficient amount of pure water at room temperature to obtain a second mixture. The second mixture is added into the first mixture, mixed evenly, cooled to room temperature, to obtain an inner core material solution.

(3) Preparation of curing solutions: 2 parts of calcium lactate and 0.05 parts of chitosan hydrochloride are uniformly dispersed into 98 parts of water to obtain an inner shell curing solution (curing solution 1). 2.5 parts of calcium lactate and 0.05 parts of chitosan hydrochloride uniformly into 97.5 parts of water to obtain an outer shell curing solution (curing solution 2).

(4) Preparation of inner bursting beads: the inner core material solution is added at a flow rate of 1 μL/s into the inner shell forming solution and incubated for 3 minutes to form a plurality of beads. The beads are collected and cured in the curing solution 1 for 5 minutes, and the solution is filtered out to obtain inner bursting beads.

(5) Preparation of outer shell forming solution: 0.8 parts of potassium alginate and sodium alginate in a ratio of 1:1 are dissolved in 99.2 parts of pure water at room temperature to obtain an outer shell forming solution. The viscosity of potassium alginate is 500 mPa·s and its G/M ratio is 1.5. The viscosity of sodium alginate is 430 mPa·s and its G/M ratio is 1.4.

(6) Preparation of outer core material solution: 0.5 parts of pullulan polysaccharide, 0.5 parts of arabic gum, 0.5 parts of guar gum are dissolved into 60 parts of pure water at 60° C. to obtain a first mixture. 2 parts of calcium lactate, 10 parts of concentrated black tea, and 0.2 parts of sucrose are dissolved in sufficient amount of pure water at room temperature to obtain a second mixture. The second mixture is added into the first mixture, mixed evenly, cooled to room temperature, to obtain an outer core material solution.

(7) Preparation of double-layered bursting beads: the inner bursting beads and the outer core material solution with a ratio of 1:1 put into a molding machine, followed by dropping at a flow rate of 5 μL/s into the outer shell forming solution and incubating them for 3 minutes to form bursting beads. The bursting beads are collected and cured in the curing solution 2 for 4 minutes, and the solution is filtered out to obtain double-layered bursting beads. The double-layer bursting beads are placed in a protective solution and sterilized at 85° C. for 15 minutes.

Example 7

Figure 2:
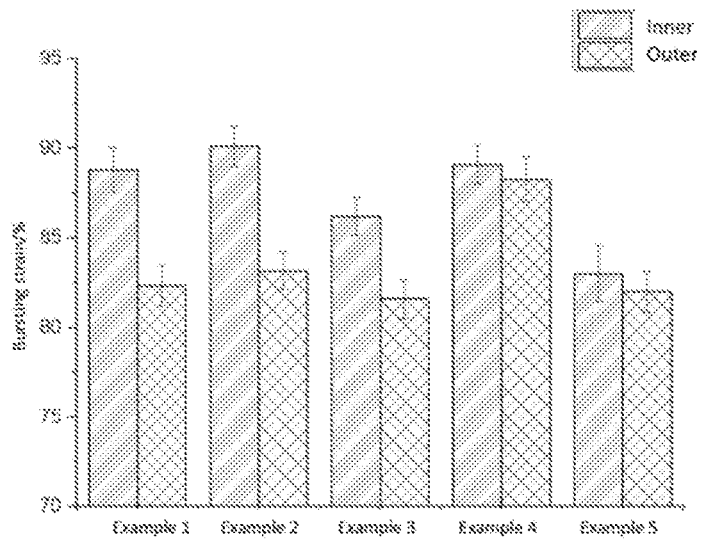
FIG. 2 shows the bursting strain results of inner shell and outer shell of embodiments 1 to 5 of the present invention.

The TA-XT2i texture analyzer was used to test the mechanical properties of the bursting beads. The bursting beads were placed in the center of a plate. The probe Cylinder Probe SMS P/0.5R was used to squeeze the bursting beads. The initial speed was 1 mm/sec, the detection speed was 8 mm/sec, and the recovery speed was 10 mm/sec. The test results are shown in FIGS. 1 and 2.

The amount of tea polyphenols was also measured. After sterilization, the bursting beads were stored for 1 month, and the samples were treated with hydrochloric acid and acetone to destroy the emulsion system and precipitate the protein to obtain the clear sample treatment solution. The amount of tea polyphenols in the sample was determined by the method of iron tartrate colorimetry, which is the test method of tea polyphenols in GB/T 21733-2008.

The thickness for the inner and outer busting beads were also measured. The results are shown in Table 1. The present bursting beads were crushed, and the core materials therefrom were squeezed out of the bursting beads and measured by a screw micrometer to determine the thickness of the inner and outer shells of the double-layered bursting beads.

TABLE 1

The thickness and the amount of tea
polyphenols in the bursting beads

| Samples | The thickness of the inner shell for the inner bursting beads (mm) | The thickness of the outer shell (mm) | The amount of tea polyphenols (mg/kg) |
|---|---|---|---|
| Example 1 | 0.25 | 0.15 | 892.6 |
| Example 2 | 0.26 | 0.17 | 632.4 |
| Example 3 | 0.22 | 0.10 | 905.3 |
| Example 4 | 0.26 | 0.24 | 854.9 |
| Example 5 | 0.16 | 0.13 | 645.6 |
| Example 6 | 0.25 | 0.17 | 682.6 |
| Comparative Example 1 | 0.24 | 0.13 | 402.09 |
| Comparative Example 2 | 0.26 | | 224.8 |

Comparing the amount of tea polyphenols in Example 1, Example 5, Comparative Example 1 and Comparative Example 2, it has been shown that the amount of tea polyphenols in Example 5 is lower than that in Example 1, which might be due to the partial migration of the outer core materials toward the inner bursting beads when the thickness of the inner shell is reduced, thus leading to the decrease in the amount of tea polyphenols. As for Comparative Example 1, the amount of tea polyphenols is about ½ of that in Example 1. Furthermore, the opacification color of the outer shell shields the clarity and transparency of the inner bursting beads, which does not only reduce the visual appeal, but also cannot effectively observe the damage of the inner bursting beads, and the reverse of the order of adding tea and milk also increases the damage rate to 40%. As for Comparative Example 2, due to the direct contact between the milk and the tea, the flocculent precipitates are rapidly formed, resulting in a sharp drop in the content of the tea polyphenols, which is about ¼ of that in Example 1. From this test, it is found that: in one aspect, in order to inhibit the penetration of the inner and outer core materials, the thickness of the inner shell needs to be slightly larger, and because of the high viscosity and high G content of sodium alginate selected for the inner shell, the thickness of the inner shell should be slightly larger, preferably within 0.225-0.275 mm; in another aspect, in order not to affect the clarity and transparency of tea, the thickness of the outer shell should be slightly smaller, and because of the low viscosity and low G content of sodium alginate selected for the outer shell, the thickness of the outer shell should be slightly smaller, preferably within 0.12-0.17 mm.

TABLE 2

The bursting force and bursting strain of the bursting beads
in Comparative Example 1 and Comparative Example 2

| | Bursting force/g | | Bursting strain/% | |
|---|---|---|---|---|
| Bursting bead samples | Inner bursting beads | outer bursting beads | Inner bursting beads | outer bursting beads |
| Comparative Example 1 | 1890 | 1095 | 86 | 82.5 |
| Comparative Example 2 | 2000 | | 90 | |
| Example 6 | 2100 | 1354 | 92 | 85 |

It can be shown from the bursting force of the bursting beads prepared in Example 1 and Example 2 that the compressive strength of potassium alginate-based bursting beads is higher than that of sodium alginate-based bursting beads. However, due to the higher cost of potassium alginate, the mechanical properties of the bursting beads can be improved by the combination of two different alginates or the selection of sodium alginate with high G content in the food industry. In addition, the mechanical properties of bursting beads in Example 1 are better than those in Example 3. The thickener in Example 1 contains chitosan hydrochloride, which is a kind of water-soluble polycationic polymer, and can react with the negative alginate ion and improve the strength of the outer shell of the bursting beads.

Comparing the bursting force of the inner and outer bursting beads obtained in Examples 1-3, it can be shown that the mechanical performance of the inner beads is better than that of the outer beads. According to the table 1, the thickness of the inner shell and outer shell are close by using the same inner and outer shell forming solutions. In Example 4, the thickness of the shell of the inner bursting bead is relatively larger due to the use of the same inner shell forming solution, which firstly affects the clear and transparent appearance of the tea; secondly, it would require larger force to break the outer shell, and the leftover feeling of the outer shell is strong. In Example 5, the outer shell forming solution was used to cause the thickness of the inner bursting bead too thin, which firstly promoted the diffusion of milk powder to the outer, making the outer tea turbid; secondly, it affected the strength of the outer shell of the inner busting bead, failing to form a strong contrast of texture and the taste seriously.

Meanwhile, as shown in FIG. 2, the bursting strain of the inner and outer bursting beads in Example 4 are both larger, and that in Example 5 is smaller. Combining Examples 4 and 5 with the bursting conditions after sterilization, it is found that the bursting rate of the inner bursting beads in Example 5 is much higher than that in Examples 1 and 4, which shows that the thicker and more flexible shell of the inner bursting beads can withstand the violent sterilization process with high temperature and pressure. Although the bursting force and strain of the bursting beads in the Comparative Examples 1 and 2 are better, the bursting beads in the Comparative Example 1 lose the essence of the clear and transparent tea; the bursting bead in the Comparative Example 2 is single-layered bursting bead, which does not only lose the essence of the clear and transparent tea, but also affect the visual appeal of the bursting beads with different levels of flocculent.

As shown in Table 1 and Table 2, the mixture of potassium alginate and sodium alginate has minor effect on the thickness of the shell of the inner and outer bursting beads in Example 7, but the protection of tea polyphenols from black tea is higher than that in Example 2; Meanwhile, the combination of potassium alginate and sodium alginate also improve the bursting force and bursting strain of the shell of the inner and outer bursting beads, leading to a synergistic effect.

The present invention, double-layered bursting beads with milk tea flavor, provides not only encapsulating two kinds of flavor beverages into the same bursting bead, but also bursting twice by force pressing while eating, resulting in flowing out tea and milk flavored beverages, which is more interesting and interactive. The new thickener formulation can improve the bursting force and density of the bursting bead, and avoid the leakage of the beverages and the loss of the flavoring substance. Meanwhile, the tea and milk are stored separately to avoid the decline of the system stability caused by the complexation browning and precipitation between the tea polyphenols and protein during the storage. In conclusion, comparing with the prior art, the present invention has improvements in both flavor and taste, and also in storage stability and mechanical properties of the product.

It should be noted that the above embodiments are only used to explain the technical scheme of the invention, not the limitation. Although the invention is described in detail with reference to the preferred embodiments, it should be understood by those skilled in the art that the technical scheme of the invention can be modified or replaced equally without departing from the spirit and scope of the technical scheme of the invention which should be covered in the right of the invention.

The invention claimed is:

1. A method for preparing double-layered bursting beads with milk tea flavor comprising:
    preparing an inner shell forming solution and an outer shell forming solution for an inner shell and an outer shell of the double-layered bursting beads;
    preparing an inner core material solution and an outer core material solution for an inner core material and an outer core material of the double-layered bursting beads;
    preparing an inner shell curing solution and outer shell curing solution for the inner shell and the outer shell of the double-layered bursting beads;
    adding the inner core material solution into the inner shell forming solution, incubating, and curing in the inner shell curing solution, followed by filtering to obtain inner bursting beads;
    adding the inner bursting beads and the outer core material solution into the outer shell forming solution, curing in the outer shell curing solution to obtain the double-layered bursting beads, wherein said preparing the inner shell forming solution comprises dissolving at least one alginate and at least one pectin gum in water;
    said preparing the outer shell forming solution comprises dissolving the at least one alginate and at least one gellan gum in water;
    said preparing the inner core material solution comprises dissolving and dispersing at least one of xanthan gum, pectin, locust beam gum, and milk powder in water to obtain a first mixture, dissolving at least one calcium lactate and at least one sugar in water to obtain a second mixture, mixing the second mixture with the first mixture homogenously;
    said preparing the outer core material solution comprises dissolving and dispersing at least one of pullulan polysaccharide, arabic gum, and guar gum in water to obtain a third mixture, dissolving at least one of calcium lactate, concentrated tea, and sucrose in water to obtain a fourth mixture, mixing the fourth mixture with the third mixture homogenously;
    said preparing the inner shell curing solution comprises dispersing at least one calcium lactate and chitosan polysaccharide in water; and
    said preparing the outer shell curing solution comprises dispersing the at least one calcium lactate and the chitosan polysaccharide in water.

2. The method of claim 1, wherein said preparing the inner shell forming solution and the outer shell forming solution comprises dissolving at least one alginate and at least one hydrocolloid in water; said preparing the inner core material solution and the outer core material solution comprises preparing a first dispersion solution made of one or more of calcium salt, hydrocolloid, additives, and any combination thereof; said preparing the inner shell curing solution and the outer shell curing solution comprises preparing a second dispersion solution made of calcium salt;
    wherein the at least one alginate comprises sodium alginate, potassium alginate and a combination thereof;
    wherein the calcium salt includes calcium lactate, calcium chloride, calcium phosphate, calcium gluconate and combinations thereof; wherein the additives include milk powder, sweetener, tea, chitosan hydrochloride and combinations thereof;
    wherein the at least one alginate is 0.5-1.5 parts, the calcium salt is 0.5-3 parts, the hydrocolloid is 0.2-2 parts, and the additives are 5-15 parts.

3. The method of claim 1, wherein a first alginate for said preparing the inner shell forming solution has a higher viscosity and guluronic acid/mannuronic acid (G/M) value than a second alginate for said preparing the outer shell forming solution.

4. The method of claim 2, wherein a first alginate for said preparing the inner shell forming solution has a higher viscosity and guluronic acid/mannuronic acid (G/M) value than a second alginate for said preparing the outer shell forming solution.

5. The method of claim 1, wherein a first alginate for said preparing the inner shell forming solution has a viscosity of approximately 600-800 mPa·s, and a guluronic acid/mannuronic acid (G/M) value of approximately 1.7-2.0; and
    a second alginate for said preparing the outer shell forming solution has a viscosity of approximately 400-600 mPa·s and a guluronic acid/mannuronic acid (G/M) value of approximately 1.3-1.7.

6. The method of claim 2, wherein a first alginate for said preparing the inner shell forming solution has a viscosity of approximately 600-800 mPa·s and a guluronic acid/mannuronic acid (G/M) value of approximately 1.7-2.0; and
    a second alginate for said preparing the outer shell forming solution has a viscosity of approximately 400-600 mPa·s and a guluronic acid/mannuronic acid (G/M) value of approximately 1.3-1.7.

* * * * *